(12) United States Patent
Lu

(10) Patent No.: US 7,070,272 B1
(45) Date of Patent: Jul. 4, 2006

(54) DETACHABLE EYEGLASS FRAME AND AVIATOR LENS ARRANGEMENT

(76) Inventor: Hsiao-Chien Lu, PO Box 82-144, Taipei (TW)

(*) Notice: Subject to any disclaimer, the term of this patent is extended or adjusted under 35 U.S.C. 154(b) by 0 days.

(21) Appl. No.: 11/060,408

(22) Filed: Feb. 18, 2005

(51) Int. Cl.
*G02C 1/04* (2006.01)

(52) U.S. Cl. .................. 351/105; 351/108; 351/140; 351/149

(58) Field of Classification Search ........ 351/103–109, 351/41, 44, 140–143, 149–152
See application file for complete search history.

(56) References Cited

U.S. PATENT DOCUMENTS 1,170,197 A * 2/1916 Styll et al. ................. 351/144
5,587,747 A * 12/1996 Bernheiser ................. 351/105

* cited by examiner

Primary Examiner—Huy Mai
(74) Attorney, Agent, or Firm—Leong C. Lei

(57) ABSTRACT

A detachable eyeglass frame and aviator lens arrangement for eyeglasses is disclosed to include an eyeglass frame having two aviator lens positioning structures, each aviator lens positioning structure having a first magnet disposed at one lateral side and an aviator lens retainer at the other lateral side, and two aviator lenses respectively detachably fastened to the aviator lens positioning structures, each aviator lens having a first lateral side which inserts into the aviator lens retainer and connectable to the aviator lens retainer by friction resistance, and a second lateral side provided with a second magnet connectable to the first magnet of one aviator lens positioning structure by magnetic attraction.

5 Claims, 4 Drawing Sheets

DETACHABLE EYEGLASS FRAME AND AVIATOR LENS ARRANGEMENT

BACKGROUND OF THE INVENTION (a) Technical Field of the Invention

The present invention relates eyeglasses and more particularly, to a detachable eyeglass frame and aviator lens arrangement for eyeglasses.

(b) Description of the Prior Art

People may wear different eyeglasses for sight correction and other different purposes (reading, distance, sunlight protection, etc.)

A pair of eyeglasses generally comprises an eyeglass frame and two eyeglass lenses affixed to the eyeglass frame. The eyeglass lenses are not detachable. One person may have to prepare several pairs of different eyeglasses for different purposes. It is inconvenient to carry multiple pairs of eyeglasses with for use in different conditions.

There are known eyeglasses that have a secondary pair of eyeglass lenses. The second pair of eyeglass lenses can be turned away from the first pair of eyeglass lenses when not used. By means of turning the second pair of eyeglass lenses between the operative position and the non-operative position, this design of eyeglasses provides two functions.

There are eyeglasses with trifocal lenses (each trifocal lens has three portions, namely, the distance, the intermediate and the reading). By means of the trifocal lenses, a pair of eyeglasses of this kind provides different functions. However, the application of these eyeglasses is subject to the trifocal lenses.

Further, contact lenses are convenient for carrying. However, it is inconvenient to wear and replace contact lenses. In order to prevent contamination, contact lenses must be frequently washed with a cleaning solution.

SUMMARY OF THE INVENTION

The primary purpose of the present invention is to provide a detachable eyeglass frame and aviator lens arrangement for eyeglasses, which enables the user to replace the aviator lenses conveniently without a tool. It is another object of the present invention to provide a detachable eyeglass frame and aviator lens arrangement for eyeglasses, which enables an eyeglass frame to be selectively used with multiple pairs of aviator lenses. To achieve these and other objects and according to one aspect of the present invention, the detachable eyeglass frame and aviator lens arrangement comprises an eyeglass frame, and two aviator lenses. The eyeglass frame comprises two aviator lens positioning structures for holding the aviator lenses respectively. Each aviator lens positioning structure comprises a first magnet disposed at a first lateral side and an aviator lens retainer disposed at a second lateral side. Each aviator lens has a first lateral side which inserts into the aviator lens retainer and connectable to the aviator lens retainer by friction resistance, and a second lateral side provided with a second magnet connectable to the first magnet of one aviator lens positioning structure by magnetic attraction. According to another aspect of the present invention, the aviator lens retainer has a substantially U-shaped profile and two raised portions symmetrically bilaterally disposed on the inside. Each aviator lens has two recessed portions disposed near the first lateral side thereof for engagement with the raised portions in the aviator lens retainer of one aviator lens positioning structure. Further, the aviator lens retainer is preferably made from a resilient metal plate and, the second magnet is preferably embedded in the respective aviator lens in flush with the inner surface of the respective aviator lens.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
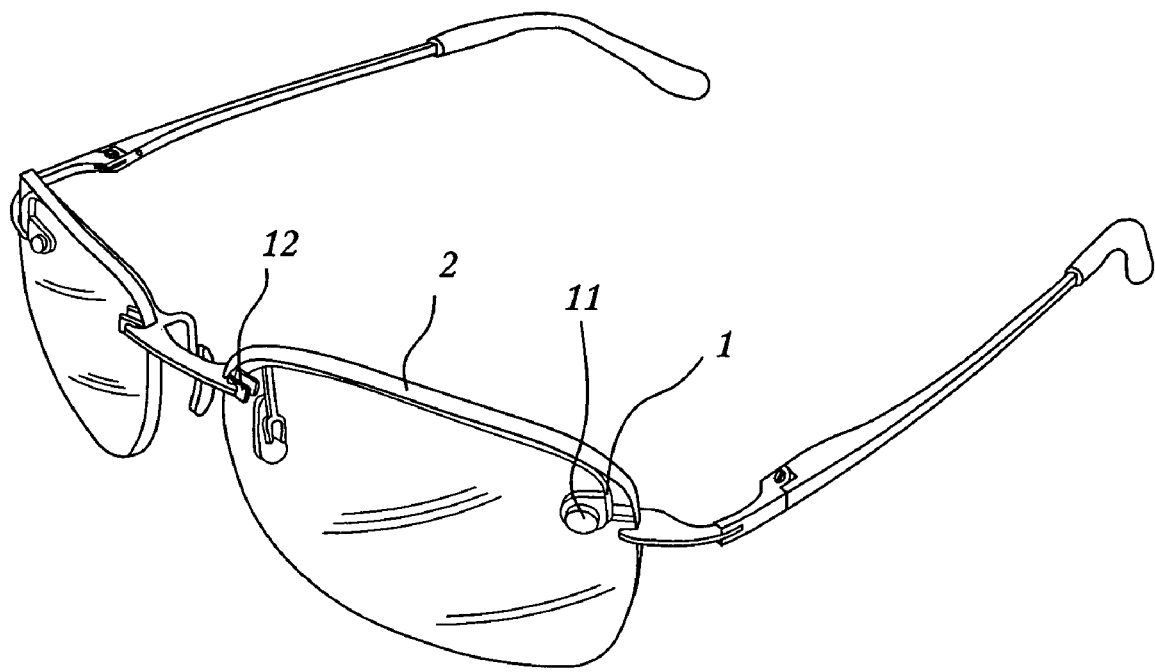
FIG. 1 is a perspective view of the preferred embodiment of the present invention.
Figure 2:
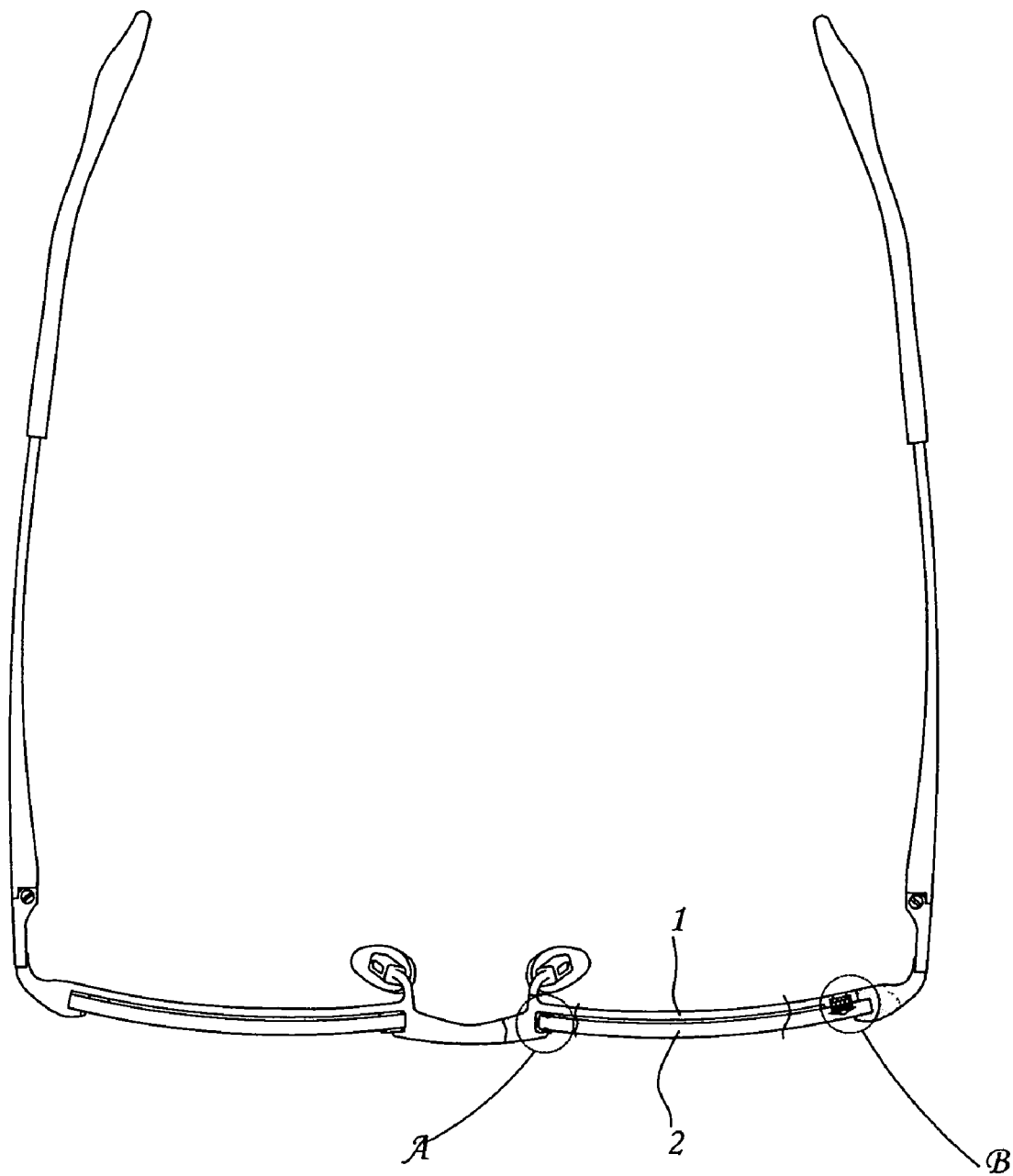
FIG. 2 is a top view of the preferred embodiment of the present invention.
Figure 3:
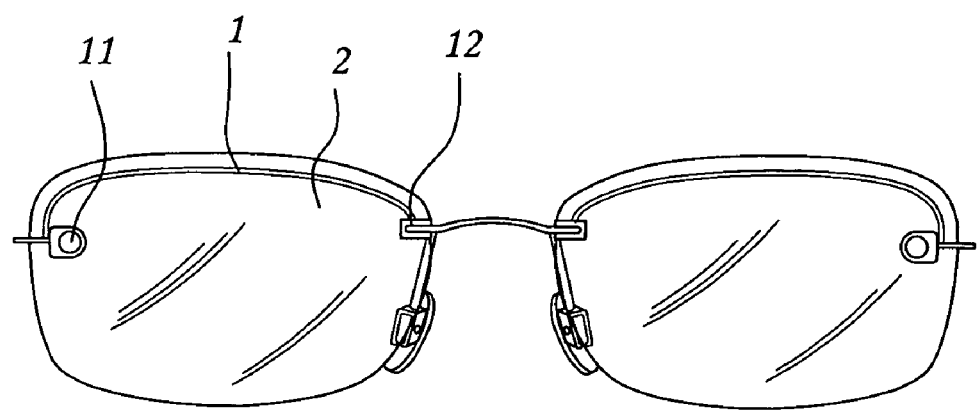
FIG. 3 is a front view of the preferred embodiment of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1–4, a detachable eyeglass frame and aviator lens arrangement for eyeglasses in accordance with the present invention is shown comprising an eyeglass frame 1 and two aviator lenses 2. The eyeglass frame 1 comprises two aviator lens positioning structures for holding the aviator lenses 2. Each aviator lens positioning structure comprises a first magnet 11 disposed at one lateral side, and an aviator lens retainer 12 provided at the other lateral side. The aviator lens retainer 12 is a U-shaped springy member made of, for example, a resilient metal plate member, having two raised portions 121 symmetrically bilaterally disposed on the inside. The first magnet 11 can be a flat, circular magnet having a proper size that does not interfere with the sight of the eye. Each aviator lens 2 has two recessed portions 21 respectively formed in the front and back surfaces thereof near one lateral side corresponding to the raised portions 121 in the aviator lens retainer 12 of one aviator lens positioning structure of the eyeglass frame 1, and a second magnet 22 disposed near the other lateral side for securing to the first magnet 11 of the aviator lens positioning structure of the eyeglass frame 1 by magnetic attraction (see also FIGS. 5 and 6). Preferably, the second magnet 22 is embedded in the aviator lens 2 in a flush manner.

Figure 4:
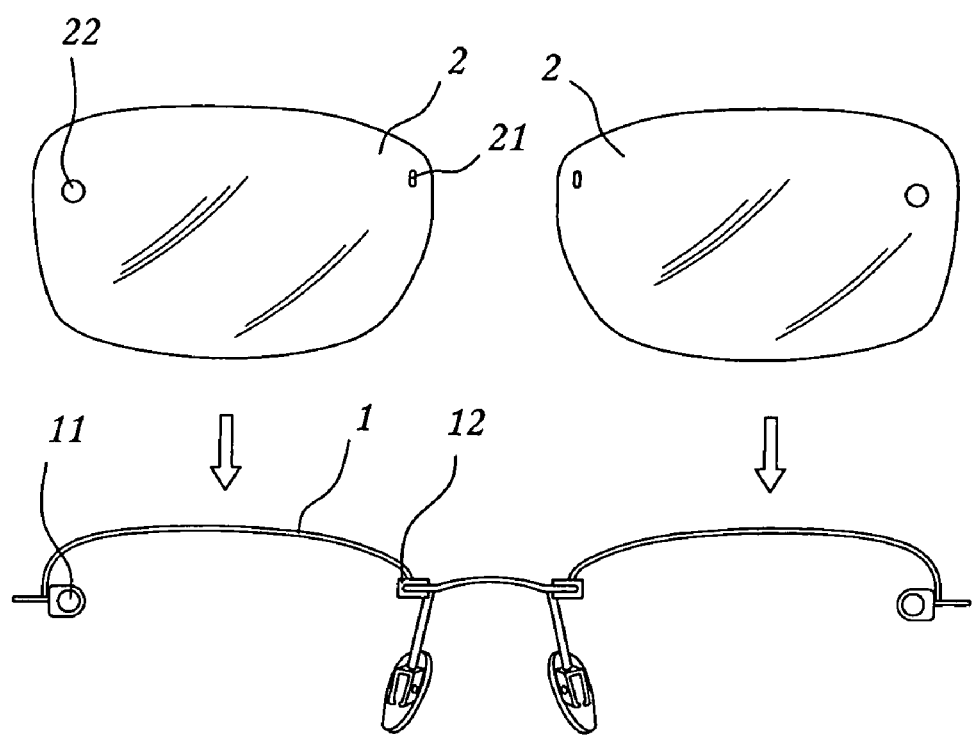
FIG. 4 is an exploded view of the preferred embodiment of the present invention.
Figure 5:
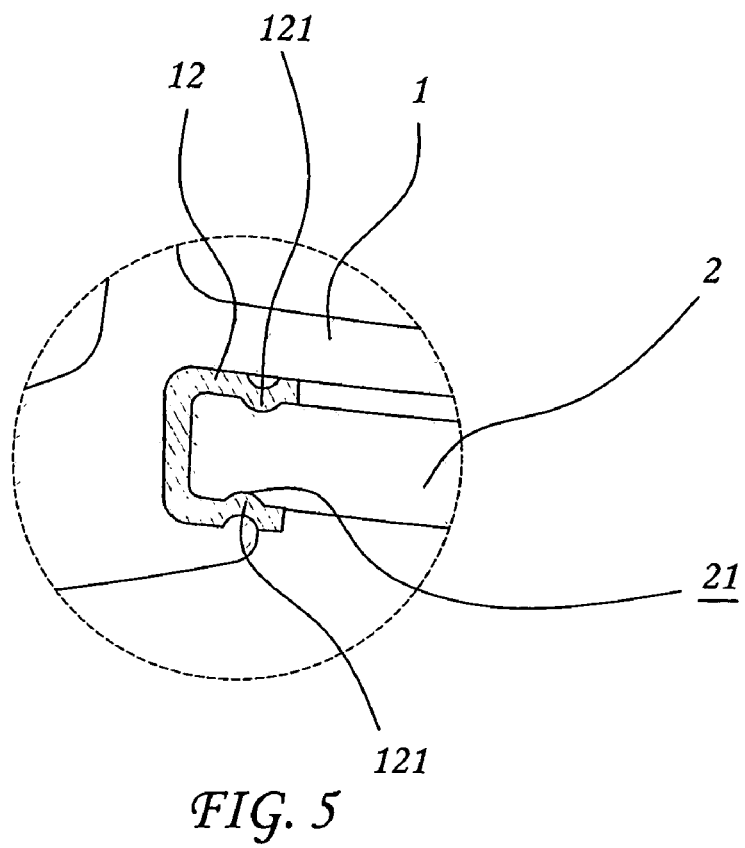
FIG. 5 is a sectional view in an enlarged scale of part A of FIG. 2.
Figure 6:
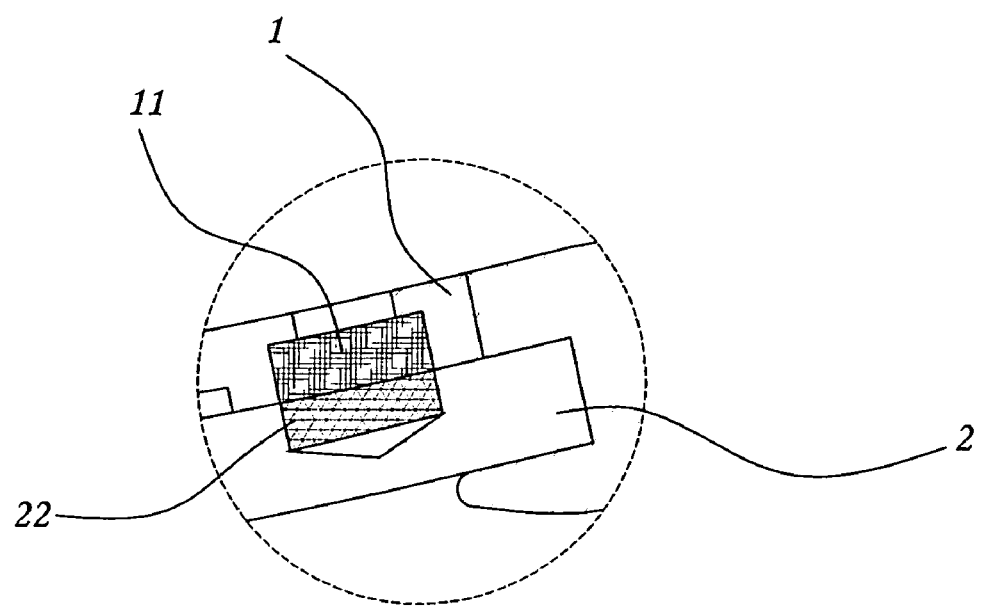
FIG. 6 is a sectional view in an enlarged scale of part B of FIG. 2.

Referring to FIGS. 4–6 and FIG. 1 again, the aviator lens 2 is inserted with one lateral side thereof into the aviator lens retainer 12 to force the recessed portions 21 into engagement with the raised portions 121 in the aviator lens retainer 12 of the respective aviator lens positioning structure of the eyeglass frame 1, and the second magnet 22 into engagement with the first magnet 11 of the respective aviator lens positioning structure of the eyeglass frame 1 by magnetic attraction. When wishing to remove the aviator lens 2 from the respective aviator lens positioning structure of the eyeglass frame 1, move the aviator lens 2 relative to the eyeglass frame 1 in one direction to disengage the respective second magnet 22 from the respective first magnet 11, and then pull the aviator lens 2 out of the respective aviator lens retainer 12.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A detachable eyeglass frame and aviator lens arrangement comprising an eyeglass frame, said eyeglass frame comprising two aviator lens positioning structures, and two aviator lenses respectively detachably fastened to said aviator lens positioning structures, wherein each said aviator lens positioning structure comprises a first magnet disposed at a first lateral side and an aviator lens retainer disposed at a second lateral side; each said aviator lens has a first lateral side which inserts into said aviator lens retainer and connectable to said aviator lens retainer by friction resistance, and a second lateral side provided with a second magnet connectable to the first magnet of one said aviator lens positioning structure by magnetic attraction.

2. The detachable eyeglass frame and aviator lens arrangement as claimed in claim 1, wherein said aviator lens retainer has a substantially U-shaped profile and two raised portions symmetrically bilaterally disposed on the inside thereof; each said aviator lens has two recessed portions disposed near the first lateral side thereof for engagement with the raised portions in the aviator lens retainer of one said aviator lens positioning structure.

3. The detachable eyeglass frame and aviator lens arrangement as claimed in claim 2, wherein the recessed portions of each said aviator lens are respectively formed in front and back surfaces of the respective aviator lens.

4. The detachable eyeglass frame and aviator lens arrangement as claimed in claim 1, wherein said aviator lens retainer is made from a resilient metal plate.

5. The detachable eyeglass frame and aviator lens arrangement as claimed in claim 1, wherein said second magnet is embedded in the respective aviator lens in flush with an inner surface of the respective aviator lens.

* * * * *